US008757235B2

(12) United States Patent
Meinzinger

(10) Patent No.: US 8,757,235 B2
(45) Date of Patent: Jun. 24, 2014

(54) MACHINE FOR LABELING CONTAINERS

(75) Inventor: Rupert Meinzinger, Kirchroth (DE)

(73) Assignee: Krones AG, Neutraubling (DE)

( * ) Notice: Subject to any disclaimer, the term of this patent is extended or adjusted under 35 U.S.C. 154(b) by 403 days.

(21) Appl. No.: 11/950,653

(22) Filed: Dec. 5, 2007

(65) Prior Publication Data

US 2008/0156442 A1 Jul. 3, 2008

(30) Foreign Application Priority Data

Dec. 29, 2006 (DE) ........................ 10 2006 062 510

(51) Int. Cl.

| | |
|---|---|
| ***B29C 65/48*** | (2006.01) |
| ***B32B 37/12*** | (2006.01) |
| ***B65C 9/02*** | (2006.01) |
| ***B65C 9/10*** | (2006.01) |
| ***B65C 9/20*** | (2006.01) |
| ***B65C 9/30*** | (2006.01) |
| *B29C 65/52* | (2006.01) |
| *B32B 37/10* | (2006.01) |
| *B65C 9/04* | (2006.01) |
| *B65C 9/22* | (2006.01) |

(52) U.S. Cl.

USPC .... 156/567; 156/568; 156/582; 156/DIG. 26; 156/DIG. 27; 156/DIG. 28; 156/DIG. 37; 156/DIG. 39

(58) Field of Classification Search

USPC ......... 156/9–11, 26–28, 37, 39, 42, 564–565, 156/573, 582, 567–568; 74/813 R

See application file for complete search history.

(56) References Cited

U.S. PATENT DOCUMENTS

| | | | | |
|---|---|---|---|---|
| 2,830,724 A * | 4/1958 | Manas | .......................... | 156/493 |
| 3,522,134 A * | 7/1970 | Von Hofe et al. | ............. | 156/571 |
| 4,362,594 A | 12/1982 | Nagano et al. | | |
| 4,369,214 A * | 1/1983 | Pfulb et al. | ..................... | 156/357 |
| 4,397,709 A * | 8/1983 | Schwenzer | .................. | 156/351 |
| 4,430,141 A * | 2/1984 | Zodrow | ........................ | 156/360 |
| 4,450,040 A * | 5/1984 | Zodrow et al. | ................ | 156/567 |
| 4,555,299 A * | 11/1985 | Voltmer et al. | ............... | 156/552 |
| 4,594,123 A * | 6/1986 | Eder | ............................ | 156/456 |
| 4,832,774 A * | 5/1989 | DiFrank et al. | ............... | 156/215 |

(Continued)

FOREIGN PATENT DOCUMENTS

| | | |
|---|---|---|
| DE | 3102950 | 1/1982 |
| DE | 4312605 | 10/1994 |

(Continued)

OTHER PUBLICATIONS

European Patent Application No. EP07021069; Mailing Date: May 9, 2008; Corresponding to German Patent Application No. 10 2006 062 510.2; filed Dec. 29, 2006.

*Primary Examiner* — Sonya Mazumdar

(74) *Attorney, Agent, or Firm* — Marshall, Gerstein & Borun LLP

(57) ABSTRACT

A machine for labeling containers, especially bottles or the like, with a stationary machine rack on which a rotary table for conveying containers is supported, and at least one labeling module, arranged to be interchangeable at or on a machine rack, for labeling the containers being guided past the labeling module by the rotary table wherein its own motor is assigned respectively to the rotary table and at least one labeling module. In order to simplify a change or replacement of a labeling module, the motor is located on the machine rack and remains there.

13 Claims, 4 Drawing Sheets

(56) References Cited

U.S. PATENT DOCUMENTS

| | | | | |
|---|---|---|---|---|
| 5,215,622 | A * | 6/1993 | Schmelzer | 156/566 |
| 5,259,913 | A * | 11/1993 | Stover | 156/566 |
| 6,357,505 | B1 * | 3/2002 | Jurgens | 156/564 |
| 6,440,249 | B1 * | 8/2002 | Swinburne | 156/230 |
| 7,269,930 | B2 * | 9/2007 | Kahlisch et al. | 53/136.1 |
| 8,104,376 | B2 * | 1/2012 | Eder | 74/813 R |
| 2004/0099379 | A1 * | 5/2004 | Erich | 156/567 |
| 2005/0188655 | A1 | 9/2005 | Thatenhorst | |
| 2006/0010836 | A1 * | 1/2006 | Kahlisch et al. | 53/415 |
| 2006/0150578 | A1 * | 7/2006 | Zwilling | 53/67 |
| 2007/0163697 | A1 | 7/2007 | Kursawe | |

FOREIGN PATENT DOCUMENTS

| | | | |
|---|---|---|---|
| DE | 19741476 | | 3/1999 |
| DE | 20302578 | | 4/2003 |
| DE | 20221208 | | 7/2005 |
| DE | 202004020477 | | 7/2005 |
| DE | 102004005994 | | 9/2005 |
| EP | 1449809 | | 8/2004 |
| WO | WO 0105590 | A1 * | 1/2001 |
| WO | WO-2005/068302 | | 7/2005 |

* cited by examiner

MACHINE FOR LABELING CONTAINERS

CROSS-REFERENCE TO RELATED APPLICATION

The present application claims the benefit of priority of German Patent Application No. 10 2006 062 510.2, filed Dec. 29, 2006. The entire text of the priority application is incorporated herein by reference in its entirety.

FIELD OF DISCLOSURE

The disclosure concerns a machine for labeling containers, especially bottles or the like, with a stationary machine rack on which a rotary table for conveying containers is supported, and at least one labeling module, arranged to be interchangeable at or on a machine rack, for labeling the containers being guided past the labeling module by the rotary table wherein its own motor is assigned respectively to the rotary table and at least one labeling module.

BACKGROUND

Such labeling machines are known from DE19741476, for example. In the labeling machine described there a rotary table is supported upon a table top arranged on a under-rack. On the circumference of the rotary table labeling sets are arranged that serve to fasten labels on containers transported on the rotary table. Each labeling set has its own motor by which it forms a spatially self-contained unit. This unit is arranged on the rotary table.

Thanks to the labeling sets, it is possible to adapt the labeling machine to various equipment variants and/or types of containers, for example varying types of bottles. Thereupon, the sets can be removed from the table top by their respective motors and replaced by new sets with their own motors appropriate to the changed containers.

WO2005/068302 shows a similar labeling machine. In this the sets with their motors are not supported on a table but on a machine rack. Here free-standing labeling sets are used that are arranged on the machine rack such that the containers can be appropriately labeled on the rotary table. With these labeling machines the sets with their motors can be exchanged as well, so there is the advantage that the sets can be easily and simply positioned thanks to a set's respective carrying rack.

With these labeling machines known from prior art, a separate motor is assigned to each labeling set in order to reduce the use of gear wheels, chains, toothed belts, cardan shafts or the like, that are necessary with the use of a single central drive motor, thereby controlling high production and mounting cost. In addition these labeling machines run more quietly.

However, as a disadvantage with these labeling machines, it has turned out that these relatively large sets require lots of room when they are not being used and can be exchanged or replaced only under complicated conditions because of their large mass. Further the labeling sets are very expensive due to the large number of different construction parts. As a labeling machine is used often for various types of containers and equipment variants, by force a large number of labeling sets remain idle in the meantime.

SUMMARY OF THE DISCLOSURE

Thus it is the problem of the present disclosure to prepare a machine for labeling containers in which the exchange or replacement of labeling sets is simplified without losing the advantage of a set's having its own motor.

This problem is solved by the machine for labeling containers, especially bottles and the like. By the separation of a labeling set into a labeling module and an affiliated motor, whereby the motor of the labeling module remains on the stationary machine rack when there is a change or replacement of the labeling module, it is possible to decrease significantly the size and weight of the part of the labeling set that is changed or replaced, i.e. the labeling module, so that a replacement or change is simplified and, additionally, the store volume is made smaller and the drive engineering expenditure is reduced. At the same time at least one labeling module has its own motor whereby, even in prior art, the use of gear wheels, chains, toothed belts, etc. is reduced. Further, machine costs are decreased since in comparison with prior art, fewer motors in all are used in the case more changeable labeling sets are employed. It is only to be noted that the remaining motor on the stationary machine rack is intended, if necessary, to drive different labeling sets in synchronicity with the other motors.

Preferably the motor of at least one labeling module can be arranged over its own carrying rack on or under the machine rack. Thanks to its own carrying rack the replacement or change of the motor is quickly and simply carried out. Further it is possible to employ the motor variably with reference to its position at, on or under the machine rack as well as the circumference position on the rotary table in order to put the motor in the appropriate place according to type of containing and intention of the labeling.

Preferably the labeling module can be formed to be dockable on the carrying rack. If the carrying rack of the motor is already on the designated and appropriate place on the machine rack, the labeling module can simply be docked on the carrying rack of the motor. On the one hand the motion transfer of the motor on the labeling module is hereby enabled and at the same time the correct alignment of the labeling module in reference to the rotary table is achieved.

According to a variant the machine rack can additionally exhibit a table top for carrying the rotary table and/or the one labeling module whereby the motor is arranged at, on or under the table top. Thus the advantages of the invention can also be achieved with the labeling machines that work with conventional table tops.

Preferably the motor, in particular a servo motor, can have a p.t.o. shaft whereby the labeling module is pivoted on the p.t.o. shaft in a docked state. A projecting p.t.o. shaft facilitates the alignment and docking of the labeling modules. At the same time the p.t.o. shaft allows the spatial separation of the drive function by the motor from the labeling function carried out by the labeling module.

According to the preferred embodiment the machine can exhibit a control unit and at least one labeling module has a recognition unit whereby identification data are transferable to the control unit in the docked state. In particular when the labeling machine is to be used for different containers, it is important to provide data to the control unit of the machine about how the labeling module is formed. Thus it is possible to drive the motors, or the moving elements of the machine, synchronously as to position and speed. Consequently one motor can be used for different labeling modules.

According to a preferred variant, especially with the use of more labeling modules, each motor can exhibit its own control unit that in the docked state receives corresponding identification data about the respective recognition modules from the affiliated labeling module. Since the motors are provided for the rotary table and labeling modules, an adaptation is carried out only for the motor on which a new labeling module is put. It is sufficient that this motor, or its control unit, contains the required modified information.

Preferably the identification data include synchronization data, particularly for the determination of the speed of the motor. For correct labeling the different motors must run synchronously as to position and speed. In order to enable this, the division ratio of the rotary table and the division ratio of the rotors of the labeling modules must be considered. With a 20-part rotary table, i.e. 20 container positions on the rotary table, and a 5-part labeling rotor, the label carrying rotor of the labeling module, or the labeling rotor, must be driven in comparison with the rotary table itself in the rotation—speed ratio of 4:1, that is motors must be transmitted in correspondence to each other. Accordingly, if a 8-part labeling module is used for example, the ratio is only 2.5:1 and the motor of the labeling module in this case should correspondingly be aimed synchronically for a smaller number of revolutions. With the use of so-called dispenser sets the identification data will include the necessary acceleration, synchronous running and stopping phases. This periodically non-uniform course of motion is moreover dependent on the respective label length.

BRIEF DESCRIPTION OF DRAWINGS

The disclosure will be subsequently described using several embodiments with reference to the figures in detail. They are.

DETAILED DESCRIPTION

Figure 1A:
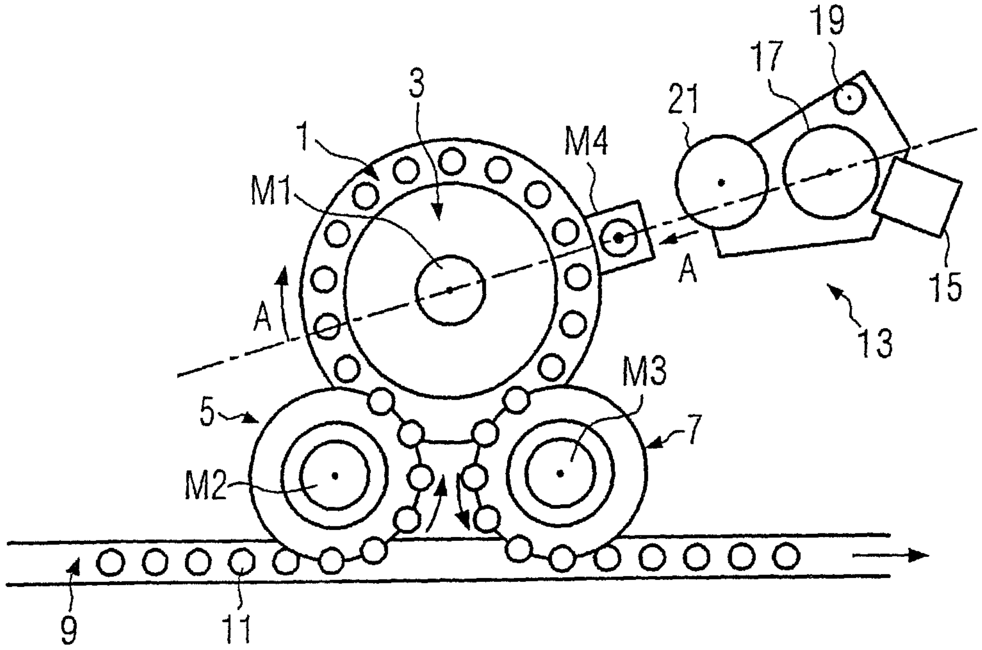
FIGS. 1*a* and 1*b*, a schematic plan view of a first embodiment of a labeling machine according to the disclosure, FIG. 2, a schematic side view of the labeling machine according to the first embodiment, FIG. 3, a second embodiment of the labeling machine in side view, FIGS. 4*a* and 4*b*, a third embodiment of a labeling machine according to the disclosure, and FIGS. 5*a* and 5*b*, a fourth embodiment of a labeling machine according to the disclosure.

The labeling machine presented in FIG. 1*a* comprises a rotary table [1], also called a carousel, on a stationary machine rack [3], in which there are an in-feed star wheel [5] and an out-feed star wheel [7] that are likewise supported by the machine rack [3]. The rotary table [1], the in-feed star wheel [5] and the out-feed star are placed to rotate and are driven by their respective motors [M1, M2, M3] synchronously in the direction of the arrow. Additionally, a conveyor belt [9] is arranged on the in-feed star wheel [5] and the out-feed star wheel [7]. Containers [11], particularly bottles or similar articles, are conducted on this conveyor belt [9] by the in-feed star wheel [5]. After passing through the rotary table [1] and the out-feed star wheel [7], the containers [11] are conducted again to the conveyor belt [9] and transported further. Not shown here is a possible additional worm gear, that is provided for the in-feed star wheel [5] and is arranged parallel to the conveyor belt.

Further, on the edge of the stationary machine rack [3] a motor [M4] is arranged. This serves as a driver for a labeling module [13] that in FIG. 1*a* is not yet docked on the machine for labeling. Instead of being arranged on the edge, the motor [M4] could be arranged underneath the rotary table [1].

In the embodiment shown, the rotary table [1] seen essentially from above closes precisely with the stationary machine rack [3], but this can be otherwise. Further, the rotary table [1] should not be made round. And the motor [M1] should not be put in the center. Rather, there can be a drive over a gear wheel or the like with an eccentrically arranged motor [M1]. It is crucial, however, that quickly changeable labeling sets can be brought into place between container in- and out-feed in the area of the rotary table.

The labeling module [13] comprises a label holder [15] with a stock of labels, a rotor [17] that serves to guide labels from the label holder [15] onto a glue cylinder [19] and then to set them on a gripper cylinder [21] and then convey them further onto the containers [11]. In the embodiment presented only one labeling module [13] is shown. According to the application, several modules, perhaps of different types, can be used. Correspondingly, more motors would then be arranged on the stationary machine rack [3]. Instead of the labeling module described other kinds of labeling modules could be used, for instance dispensing label modules as described in DE 600 15 376 T2. Further, roll-cut labeling sets can be used for separating single labels from a roll of labels.

The motors [M1 to M4], e.g. servo motors, are synchronized with each other so that the different elements can be driven synchronously with each other as to position and speed. Particularly, motor [M4] should be so designed that it can operate various labeling modules with various requirements.

Figure 1B:
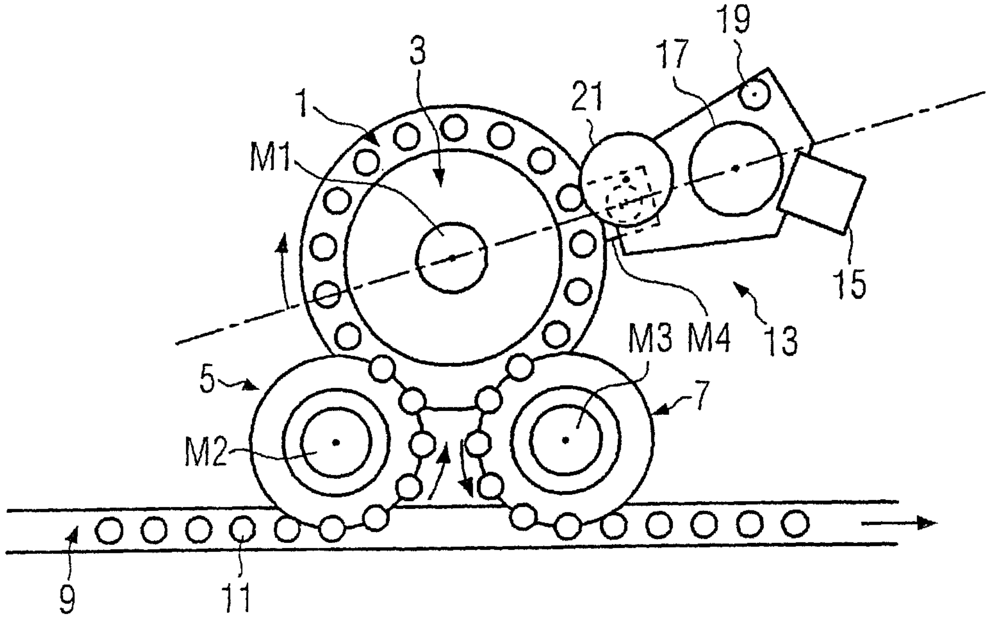

FIG. 1*b* shows the docked state of the labeling unit [13]. Motor [M4] is thereby used for driving the parts of the labeling module [13]. In the docked state the rotor [17] can take labels from the label holder [15] guide them past the glue cylinder [19] and present them to the gripper cylinder [21]. Containers [11] on the rotary table [1] go past the labeling module [13] so that the labels prepared by the gripper cylinder [21] can be glued on the containers [11] in the exact position required.

To simplify the docking of the labeling module [13], this has connectors to the energy and compressed air supply and signal transmission that can be inserted in appropriate counterparts on the machine rack [1] and/or motor [4].

The particular feature on the labeling machine represented in FIGS. 1*a* and 1*b* is that the motor [M4} and the labeling module [13] are designed such that the motor [M4] remains on the machine rack [3] of the labeling machine for a change or replacement of the labeling module [13].

Thus, since the motor [M4] remains on the machine rack [3] of the labeling machine for a change or replacement of the labeling module [13], the labeling module [13] is more compact and lighter than the labeling sets of prior art. Changes or replacements are thereby simplified and the support surface reduced. The labeling machine according to the disclosure can be adapted quickly and easily to new containers and/or equipment variants and in case of the breakdown of a labeling module can be quickly repaired. Besides, costs are decreased considerably since, for several labeling modules [13] that are used particularly when the labeling machine is employed for different products, only one motor is needed.

A fixed, if necessary, spacious arrangement of the motor [M4] and possibly additional motors, in case several labeling modules are used, turns out to be advantageous since flexibility with the place of insertion of the labeling modules on the rotary table is no longer necessary.

Figure 2:
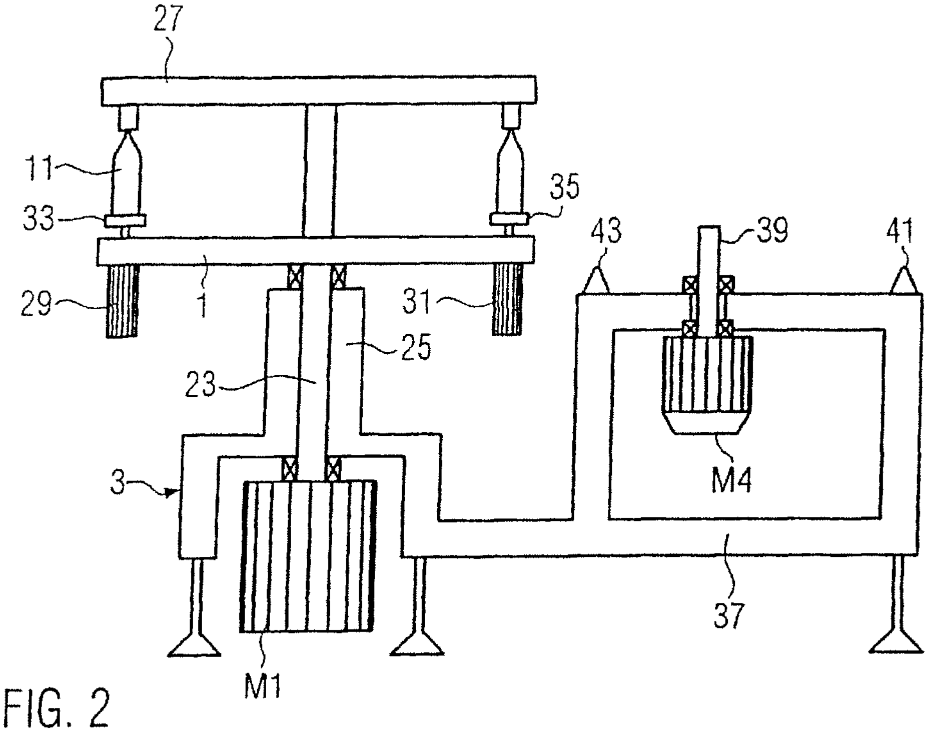

FIG. 2 shows a schematic cross-sectional representation, along the cut line AA in FIG. 1*a*, from the side of the labeling machine according to the first embodiment without the labeling module [13].

The stationary machine rack [13] with its motor [M1] is recognizable the vertical shaft [23] of which is inserted into a hollow bearing column [25] of the machine rack [3]. The rotary table [1] and a possible top [27] situated over it are driven over the vertical shaft [23]. Additional motors [29, 31]

are arranged on the rotary table [1] that serve to drive the rotary plates [33, 35]. The containers [11] to be labeled are carried on these rotary plates [33, 35] and in the labeling process are guided past the gripper cylinder [21] of the labeling module [13]. The motors [29, 31] are driven synchronously with the other motors as to position and speed.

The stationary machine rack [3] formed in one piece in this embodiment further comprises a carrying rack [37] that carries the motor [M4] serving to drive the labeling module [13]. The motor [M4] has a p.t.o. shaft [39] by which the rotating elements of the labeling unit [13] can be driven in the docked state.

The carrying rack [37] of this embodiment further serves as a support for the labeling module [13]. Centering units [41, 43] are provided on the carrying rack [37] that mesh with the labeling module [13] in appropriate recesses (not shown) in order to be able to line up the labeling module [13] in an exact position in docking.

Figure 3:
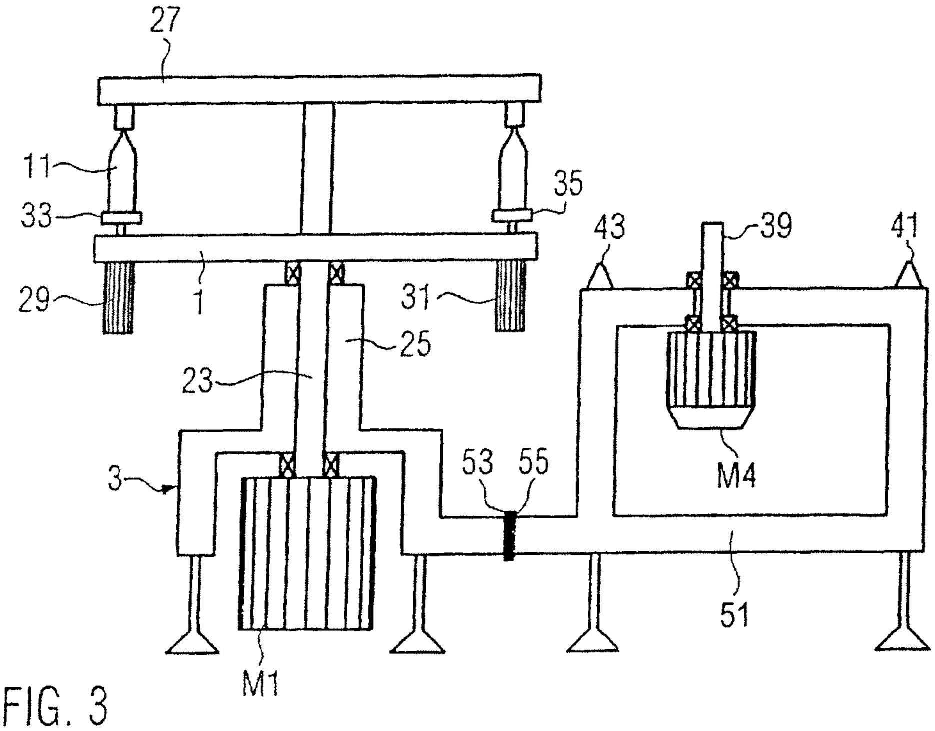

FIG. 3 shows a schematic side view of a second embodiment of the inventive machine for labeling that, in comparison with the first embodiment shown in FIGS. 1*a*, 1*b* and 2, differs only in that the carrying rack [51] is a separate structural part that can be fastened onto the stationary machine rack [3].

For this the appropriate coupling elements [53, 55] are provided on the stationary machine rack [3] and the carrying rack [51]. These are typically bolts or pins that are inserted into corresponding holes and connected with each other by clamping plates. Otherwise the second embodiment of the labeling machine shows the same parts as the first embodiment, the description of which is referred to here. With the machine according to the second embodiment the same advantages are achieved as with the machine of the first embodiment.

Alternatively to the first and second embodiments, it is conceivable to arranged the motor [M4] for driving the labeling module [13] underneath the rotary table [1]. In this case, the p.t.o. shaft [39] can typically run horizontal and preferably radial whereby the vertical rotation direction over the corresponding articulation elements in the labeling module, that is necessary for driving the different elements of the labeling module [13], is achieved. In this case the labeling module [13] is not placed on the carrying rack [37, 51] but can be led to the rotary table [1] as a free-standing module. Then it can be fastened there in a conventional manner on the stationary machine rack [3] of the carrying rack of the labeling machine.

Figure 4A:
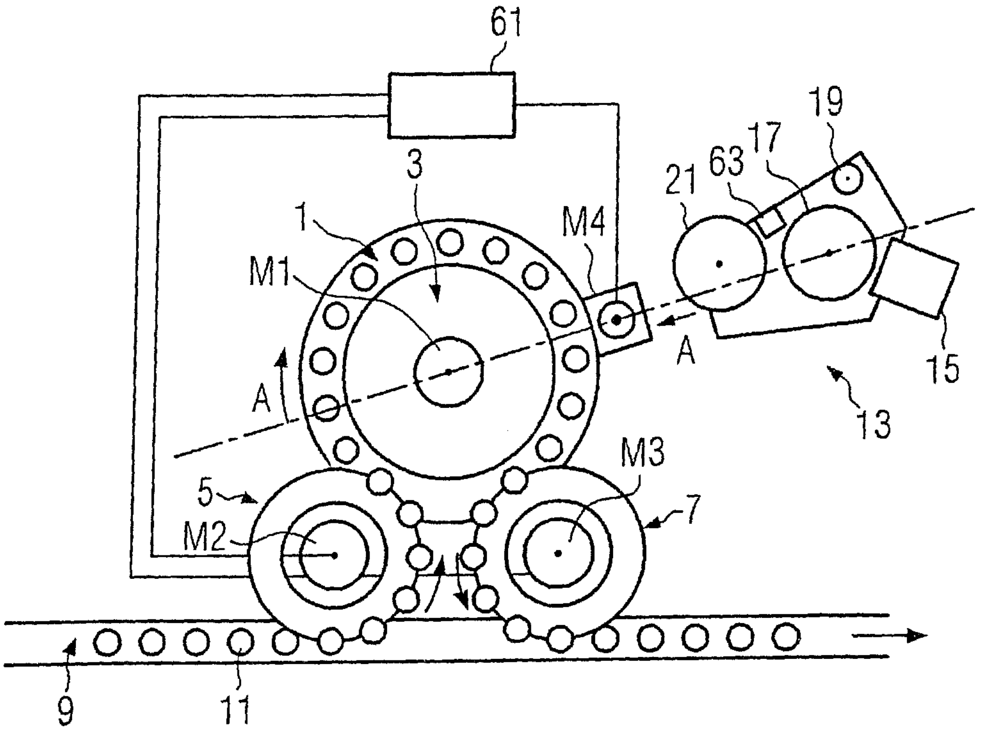
Figure 4B:
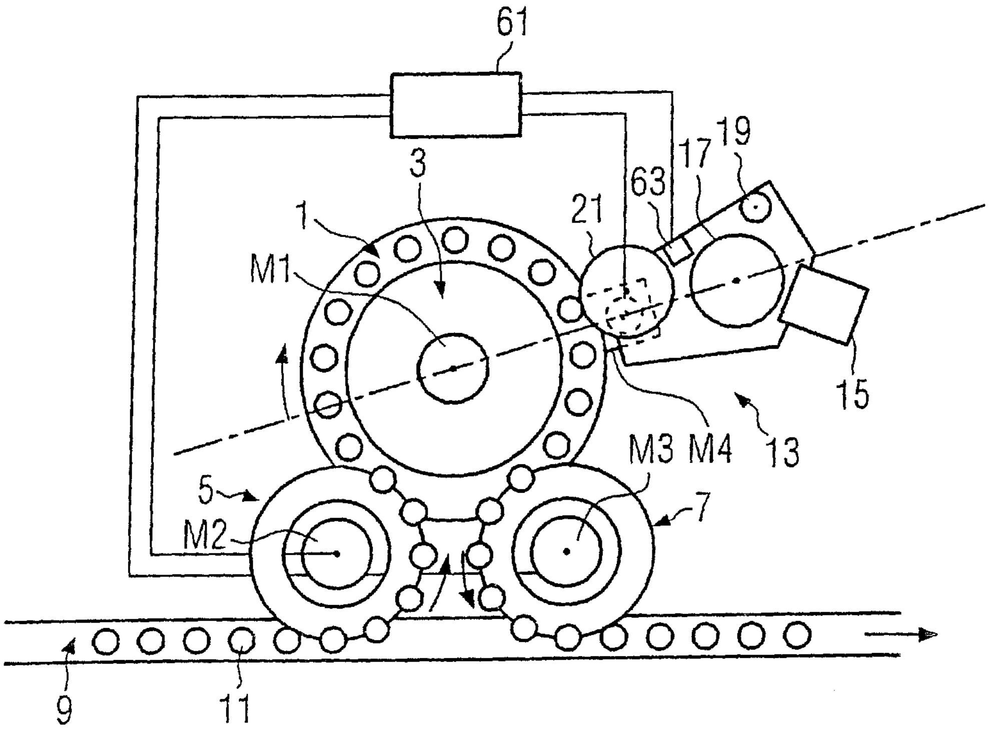

FIGS. 4*a* and 4*b* show a third embodiment of the machine for labeling containers. As an addition to the features of the first or second embodiment, the labeling machine of the third embodiment has a central control unit [61] that is connected with the motors [M1, M2, M3 and M4]. The central control unit [61] controls the motors in connection with a machine rotary position transducer not shown so that positioning and speed work synchronously with each other. The other elements and their features correspond to those of the first and second embodiment referred to above.

Further in the third embodiment there is a recognition unit [63] on the labeling module [13] that is connected with the control unit [61] as well, in the docked state (FIG. 4*b*). The stated connections could be plug-in connectors but it is also conceivable to make them wireless, for example by radio or optical.

The recognition unit [63] transmits identification data to the control unit [61] so that the motor [M4] can be controlled by the control unit [61] corresponding to the demands of the labeling module [13]. If a 20-part rotary table [1] is used and a 5-part labeling module, then the motors [M1 and M4] should drive the rotary table [1] or the gripper cylinder [21] at a speed ratio of 1:4. If the labeling module [13] is then replaced by another labeling module with which an 8-part gripping cylinder [21] is used, the control unit [61] should control the motors [M1 and M4] so that there is a speed ratio of 1:2.5. Thus with the use of different labeling modules [13] there will be a guarantee that the labeling machine will work synchronously in positioning and speed.

Alternatively, the recognition unit [63] can deliver identification data directly to the respective control unit of the motor [M4]. In that case, this would be connected in turn with the central control unit [61].

With the machine according to the third embodiment, the same advantages are achieved as with the machine of the first embodiment. Besides, automatic adaptation to other labeling modules is made possible.

Figure 5A:
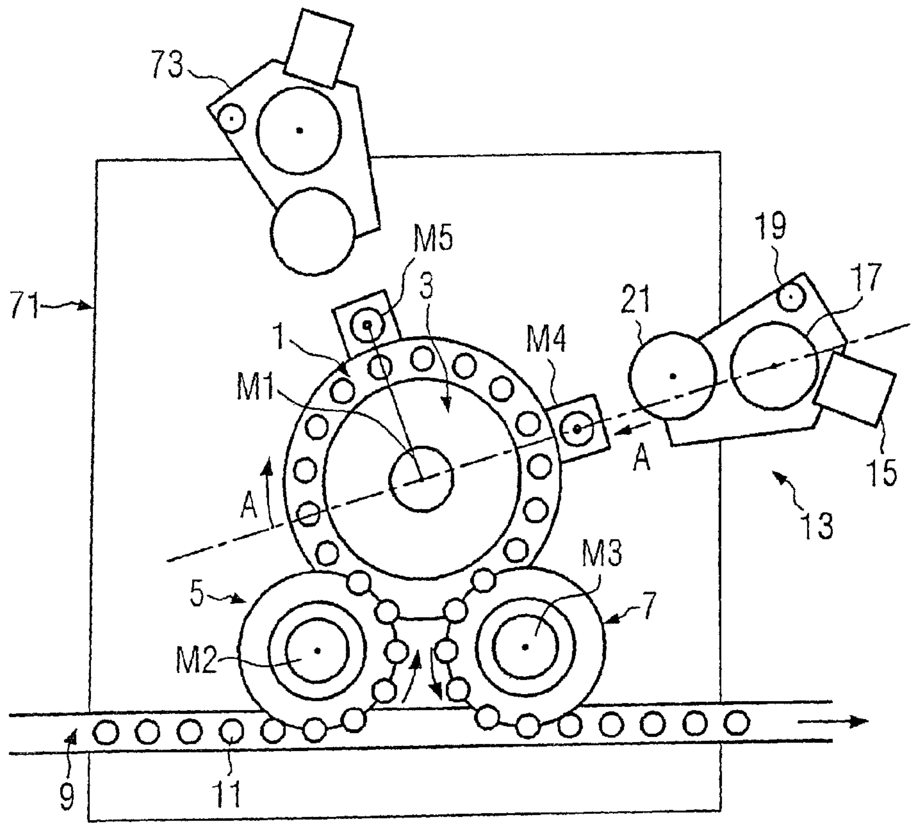
Figure 5B:
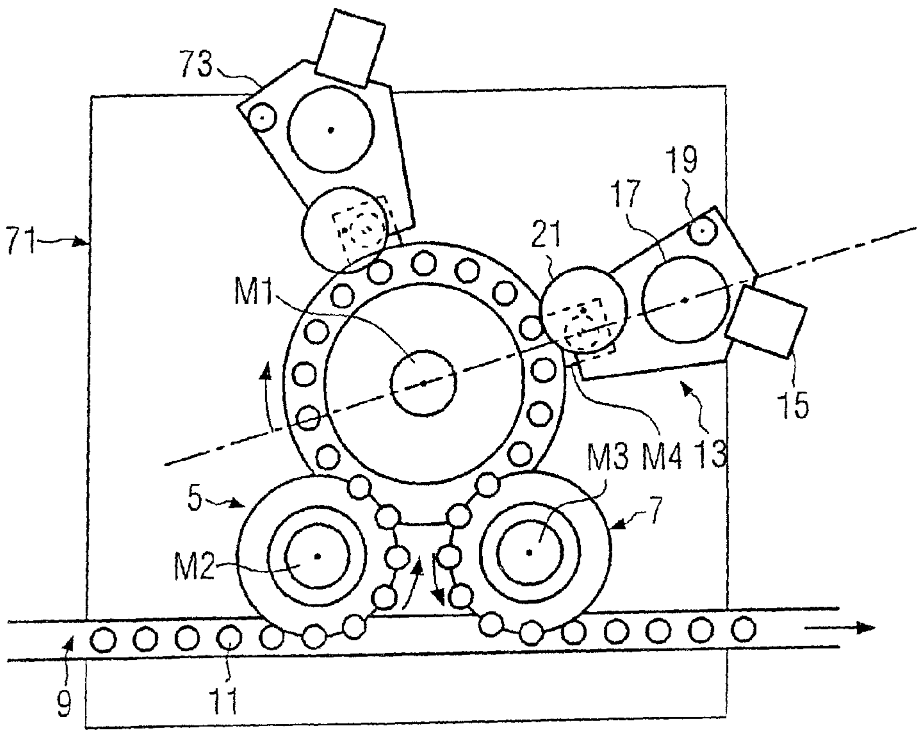

FIGS. 5*a* and 5*b* show a fourth embodiment of the machine for labeling according to the disclosure whereby FIG. 5*b* shows again the machine with docked labeling module [13]. In contrast to the previous embodiments one to three, the machine rack has a table top [71] as is used also in conventional labeling machines. The table top [71] carries two labeling modules [13, 73] in a docked state (see FIG. 5*b*) whereby more or less modules can be used according to the application. The motors [M4 and M5] for driving the sets [13 and 73] can be arranged above or below the table top [71] as long as the respective p.t.o. shaft [39] can accordingly drive the labeling modules [13 or 83]. Further elements of the machine according to the fourth embodiment correspond to the elements of the machine of the embodiments described above.

The same advantages are achieved with the machine according to the fourth embodiment as with the machine of the first embodiment.

The embodiments one to four described above as well as variants of them can be combined with each other at will. Besides, elements of the different embodiments that have the same reference numbers are corresponding elements that have the same features.

The invention claimed is:

1. A machine for labeling containers, especially bottles, comprising:

a stationary machine rack on which a rotary table for conveying containers is supported, wherein a first motor is assigned to the rotary table, and a labeling set comprising:

at least one labeling module, arranged to be interchangeable at or on the machine rack, for labeling the containers being guided past the at least one labeling module by the rotary table, wherein the at least one labeling module comprises a label holder with a stock of labels, a rotor, a glue cylinder and a gripper cylinder; and at least one second motor, separate from the at least one labeling module, is assigned to each of the at least one labeling modules, wherein the at least one second motor is used for driving the at least one labeling module;

wherein the at least one second motor and the at least one labeling module are so designed that the at least one second motor remains one of at or on the machine rack with one of an exchange and replacement of the at least one labeling module, wherein exchanging or replacing the at least one labeling module comprises exchanging or replacing all parts of the at least one labeling module.

2. The machine according to claim 1, wherein the at least one second motor assigned to the at least one labeling module is arranged to be removable over its own carrying rack one of on or under the machine rack.

3. The machine according to claim 2, wherein the at least one labeling module is designed to be dockable on the carrying rack.

4. The machine according to claim 1, wherein the machine rack has a table top for carrying one of the rotary table and the at least one labeling module, whereby the motor assigned to the at least one labeling module, is arranged one of at, on or under the table top.

5. The machine according to claim 1, wherein the at least one second motor assigned to the at least one labeling module has one of a power takeoff shaft whereby the at least one labeling module is pivoted to the power takeoff shaft in the docked state.

6. The machine according to claim 1, wherein the machine has a control unit and at least one of the labeling modules has a recognition unit by which identification data is transmittable to the control unit in the docked state.

7. The machine according to claim 6, wherein there are several labeling modules, and each second motor assigned to each of the labeling modules has its own control unit that receives corresponding identification data in the docked state from the appropriate labeling module concerning the respective recognition module.

8. The machine according to claim 6, wherein the identification data comprises synchronization data.

9. The machine according to claim 1, wherein the machine has at least one rotary position transducer for continuous determination of the rotary speed and position of the rotary table.

10. The machine according to claim 5, wherein the at least one second motor assigned to the at least one labeling module is a servo motor.

11. The machine according to claim 8, wherein the synchronization data is for the determination of the speed of the respective at least one second motor.

12. A machine for labeling containers, especially bottles, comprising:

a stationary machine rack on which a rotary table for conveying containers is supported, wherein a first motor is assigned to the rotary table, and a labeling set comprising:

at least one labeling module, arranged to be interchangeable at or on the machine rack, for labeling the containers being guided past the at least one labeling module by the rotary table, wherein the at least one labeling module comprises a dispensing label module; and at least one second motor, separate from the at least one labeling module, is assigned to each of the at least one labeling modules and used for driving the at least one labeling module;

wherein the at least one second motor and the at least one labeling module are so designed that the at least one second motor remains one of at or on the machine rack with one of an exchange and replacement of the at least one labeling module, wherein exchanging or replacing the at least one labeling module comprises exchanging or replacing all parts of the at least one labeling module.

13. A machine for labeling containers, especially bottles, comprising:

a stationary machine rack on which a rotary table for conveying containers is supported, wherein a first motor is assigned to the rotary table, and a labeling set comprising:

at least one labeling module, arranged to be interchangeable at or on the machine rack, for labeling the containers being guided past the at least one labeling module by the rotary table, wherein the at least one labeling module comprises a roll-cut labeling device used for separating single labels from a roll of labels; and at least one second motor, separate from the at least one labeling module, is assigned to each of the at least one labeling modules and used for driving the at least one labeling module;

wherein the at least one second motor and the at least one labeling module are so designed that the at least one second motor remains one of at or on the machine rack with one of an exchange and replacement of the at least one labeling module, wherein exchanging or replacing the at least one labeling module comprises exchanging or replacing all parts of the at least one labeling module.

* * * * *